United States Patent
Codello

(10) Patent No.: US 9,751,117 B2
(45) Date of Patent: Sep. 5, 2017

(54) SUCTION APPARATUS FOR A WORK MACHINE, SUCH AS A LASER BRIDGE, FOR AN EMBROIDERY/SEWING MACHINE

(71) Applicant: SEIT ELETTRONICA S.R.L., Valdobbiadene (IT)

(72) Inventor: Claudio Codello, Valdobbiadene (IT)

(73) Assignee: SEIT ELECTRONICA S.R.L., Valdobbiadene (IT)

( * ) Notice: Subject to any disclaimer, the term of this patent is extended or adjusted under 35 U.S.C. 154(b) by 401 days.

(21) Appl. No.: 14/377,037

(22) PCT Filed: Feb. 8, 2013

(86) PCT No.: PCT/IB2013/000160
§ 371 (c)(1),
(2) Date: Aug. 6, 2014

(87) PCT Pub. No.: WO2013/117984
PCT Pub. Date: Aug. 15, 2013

(65) Prior Publication Data
US 2015/0004896 A1    Jan. 1, 2015

(30) Foreign Application Priority Data
Feb. 8, 2012 (IT) .............. UD2012A0020

(51) Int. Cl.
*B08B 15/02* (2006.01)
*D05C 7/00* (2006.01)
*B23K 26/142* (2014.01)

(52) U.S. Cl.
CPC ............ *B08B 15/02* (2013.01); *B23K 26/142* (2015.10); *D05C 7/00* (2013.01); *D05D 2207/04* (2013.01)

(58) Field of Classification Search
CPC ........ B08B 15/02; B23K 26/142; D05C 7/00; D05D 2207/04
(Continued)

(56) References Cited

U.S. PATENT DOCUMENTS 3,057,287 A * 10/1962 Gray ................. B08B 15/02
454/67
3,403,947 A * 10/1968 Johnson ............. B23Q 11/08
384/15
(Continued)

FOREIGN PATENT DOCUMENTS

FR    2774559 A1    8/1999
JP    2009160442 A1    7/2009
(Continued)

OTHER PUBLICATIONS

PCT Search Report dated Jun. 14, 2013 of Patent Application No. PCT/IB2013/000160 filed Feb. 8, 2013.

*Primary Examiner* — Steven B McAllister
*Assistant Examiner* — Reginald McNeill, II
(74) *Attorney, Agent, or Firm* — Maine Cernota & Rardin

(57) ABSTRACT

Suction apparatus for a work machine, such as a guide, or laser bridge, for an embroidery/sewing machine, suitable to take in the harmful fumes generated by work operations, having at least a cutting unit to carry out work operations, a suction channel, provided with at least a longitudinal aperture, a cover element to cover the longitudinal aperture, a suction pipe and a lifting element solid with the cutting unit, interposed between the suction pipe and the suction channel and defining a compartment.

6 Claims, 4 Drawing Sheets

(58) Field of Classification Search
USPC .................................................. 454/64; 52/5
See application file for complete search history.

(56) References Cited

U.S. PATENT DOCUMENTS

| | | | |
|---|---|---|---|
| 5,915,316 A | 6/1999 | Tajima et al. | |
| 2003/0183117 A1* | 10/2003 | Morris | B60M 5/00 104/2 |
| 2016/0232936 A1* | 8/2016 | Poorman | G11B 15/60 |

FOREIGN PATENT DOCUMENTS

| | | | |
|---|---|---|---|
| JP | 2011016135 A * | 1/2011 | |
| JP | 2011016135 | 8/2012 | |
| WO | 0207905 A1 | 1/2002 | |

* cited by examiner

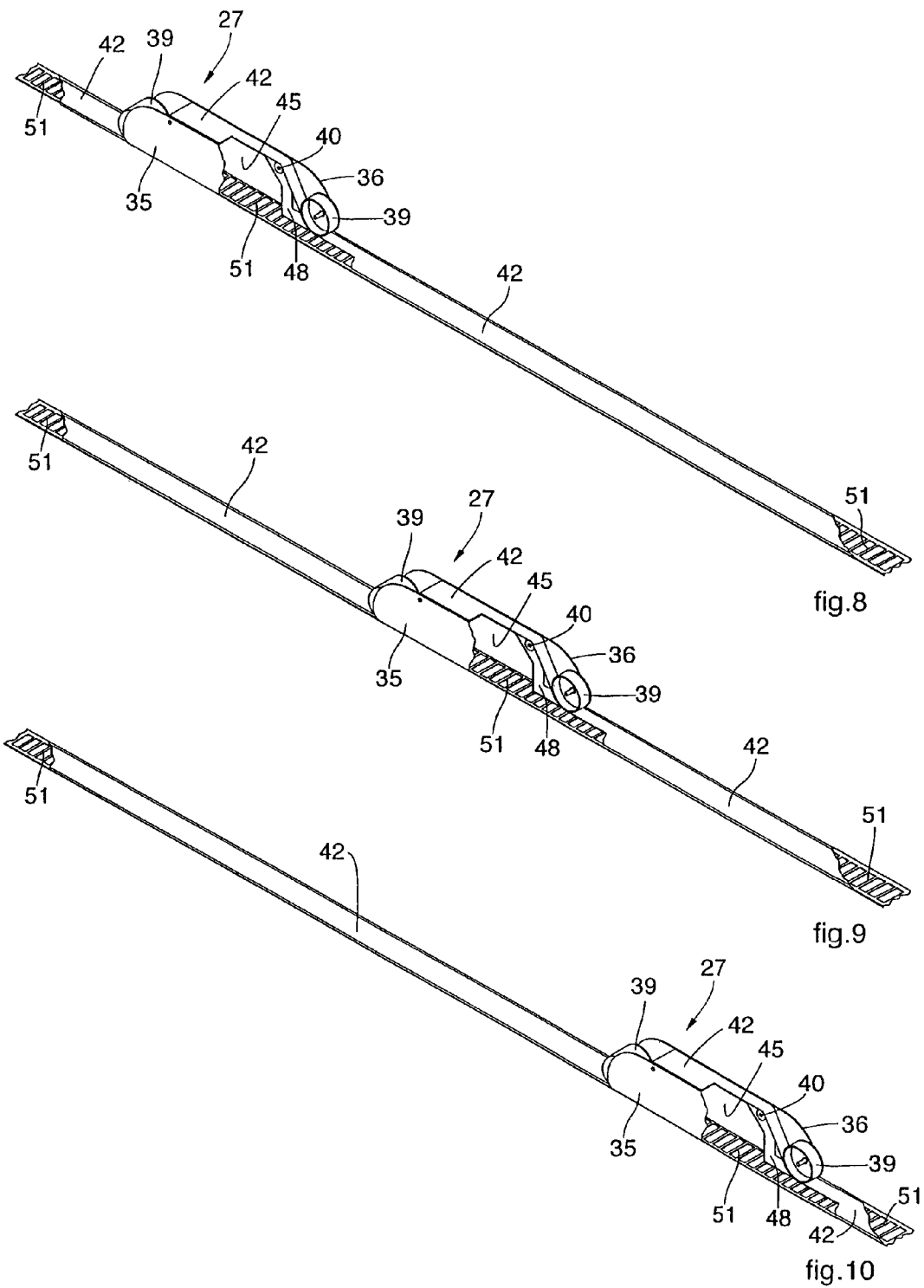

SUCTION APPARATUS FOR A WORK MACHINE, SUCH AS A LASER BRIDGE, FOR AN EMBROIDERY/SEWING MACHINE

RELATED APPLICATIONS

This application is a national phase application of PCT Application No. PCT/IB2013/000160 filed on Feb. 8, 2013, which claims priority from Italian Application No. UD2012A000020 filed on Feb. 8, 2012. Each of these applications is herein incorporated by reference in their entirety for all purposes.

FIELD OF THE INVENTION

The present invention concerns a suction apparatus applicable to a work machine, in particular but not only to a laser bridge for an embroidery/sewing machine used for embroidering or applying decorative patterns on fabrics, articles of clothing, shoes, leather-wear in general, or other, and which uses a laser cut associated with the embroidering/sewing operation.

In particular, the suction apparatus according to the invention provides to generate a suction condition in proximity to a zone of the machine, and in particular a zone where at that moment a process is under way for which a suction function is required.

BACKGROUND OF THE INVENTION

Suction apparatuses are known, associated with work machines such as for example laser bridges for an embroidery/sewing machine, like the one described in U.S. Pat. No. 5,915,316, to generate a suction condition in a determinate zone of the machine where during working harmful fumes are produced, generated for example by the laser cut performed before or after the embroidering operation.

Embroidery machines are known for embroidering or applying decorative patterns formed for example by at least a layer of fabric or material on the surface of other fabrics or articles of clothing, shoes or leather-wear.

The known embroidery machine consists of a work bench, one or more embroidery heads attached to the work bench and a cutting unit sliding on a longitudinal guide or laser bridge, to move from an inactive position, in which it does not interfere with the workings of the embroidery head, to an operating position, in which it is disposed in proximity to the embroidery head in order to cut and possibly to remove the superfluous part of the fabric surrounding the part of the fabric embroidered by the embroidery head, and vice versa.

The cutting unit normally comprises at least a laser head that moves along the bridge to position itself in the correct position where it performs the cutting operation. During the cutting operation harmful fumes are generated, which have to be aspirated and expelled to the outside.

It is therefore known to use a suction apparatus that is associated with the laser head and is provided with a suction pipe connected to the cutting unit and mobile therewith to generate the suction of the fumes.

Given that the laser head is mobile along the bridge, the suction pipe is flexible and follows its movements as it moves from the inactive position to the operating position and vice versa, or to an intermediate position.

To this purpose, the suction pipe can be associated with a flexible cable-bearer channel which takes electric feed to the laser head.

The suction pipe, which is normally a pipe made of plastic material associated with a metal coil used for stiffening purposes, unwinds during the movement of the laser head, stretching and retracting depending on the position of the cutting unit.

One disadvantage is that the suction pipe is subjected to a continuous variation in its curvature, in relation to the movement of the laser head. Furthermore, the plastic material gets worn, breakages and cracks form, and therefore it requires frequent maintenance and repair work.

Furthermore, the corrugated surface of the pipe, in conjunction with its curvature, generates large losses of load, which require suction devices with high power.

Moreover, this solution causes a large bulk above the laser head, difficulties in assembly, in transport and in access for the maintenance workers.

A suction apparatus is also known that provides a fixed suction channel, which is associated with and extends for the entire length of the longitudinal guide.

The suction channel is provided with a slit made along its whole longitudinal extension and at the sides of which two bands are associated, disposed with respect to each other so as to form a flap for closing the suction channel.

A divarication element is mounted on the laser head and moves solidly therewith, to selectively act on the closing flap in relation to the position of the laser head. In this way, the suction pipe is selectively connected to the slit through the open segment of the closing flap defined by the strips.

The devarication element is in turn connected to possible pipes to reach the suction zone.

One disadvantage of this solution is the considerable friction that is generated due to the sliding of the surfaces of the divarication element and the two bands, entailing a premature wear of the bands.

Another disadvantage is that, at the extreme sides of the divarication element, the two bands, in correspondence with the point where they divide, determine the formation of gaps, which cause losses of load and reduction in the suction capacity.

Both these known suction apparatuses are complex to make, to assemble, to transport, they are not very flexible or adaptable to the different sizes of the plant and they require frequent maintenance interventions.

One purpose of the present invention is to obtain a suction apparatus for a work machine that is efficient, easy and quick to assemble and transport, and which does not require frequent maintenance interventions over time.

Another purpose of the present invention is to reduce the suction power required.

Another purpose is to obtain an economical suction device that is quickly and easily adapted to the different sizes of the plant.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purposes, a suction apparatus according to the present invention which overcomes the limits of the state of the art and eliminates the defects therein, can be associated with a work machine, in particular but not only a laser bridge associated with an embroidery/sewing machine used for embroidery or the application of decorative patterns on fabrics, articles of clothing, shoes, leather-wear, leather or other suitable or similar material.

The embroidery/sewing machine comprises at least a work bench on which a fabric to be worked is attached, one or more heads associated with the work bench to perform the embroidery/sewing operation, a cutting unit, for example laser, sliding on a longitudinal guide or bridge to be disposed selectively in correspondence with at least one embroidery head, in order to cut and/or slice the superfluous material around an embroidered part following the embroidery work.

The suction apparatus comprises at least a suction device for harmful fumes, dust, fluff or other impurities or waste deriving from the working, a suction channel, provided with at least one longitudinal aperture, a cover element to cover the longitudinal aperture, a suction pipe that connects the cutting unit to the suction channel.

A lifting element, solid with the cutting unit and mobile therewith, is interposed between the suction pipe and the suction channel and defines a compartment communicating with the suction channel and the suction pipe.

According to the main feature of the present invention, the lifting element comprises at least a lifting roller suitable to selectively lift the cover element and define a passage, with a limited size, that is created in correspondence with the position of the lifting element, so that part of the compartment is closed by the cover element while the only part connected to the suction pipe is the one that corresponds to the raised part of the cover element. The surface of the lifting roller cooperates with the surface of the cover element.

According to a variant, instead of the lifting roller a lifting mean can be used, shaped following alternative profiles and having the same function.

Since the cutting unit and the lifting element are solid with each other, as they slide along the longitudinal guide or bridge the cover element, and therefore the compartment, are lifted, in correspondence, and only for the short segment generated by the lifting element, with the position of the lifting element, thus uncovering a limited segment of the longitudinal aperture. In this way, during the translation of the cutting unit in order to be positioned in correspondence with the zone being worked at that moment, and hence of the lifting element, the laser head is always in communication with the suction device, through the suction channel. In this way the presence of pipes subjected to a continuous variation in the curvature is avoided, which, together with the losses of load, would require high-power suction devices and would entail great wear.

In one solution of the invention, the cover element consists of a tape or strip made, for example but not only, of rubber material or suchlike, attached for example to the two ends of the suction channel, and having a length such as to cover at least the longitudinal aperture provided on the suction channel.

According to a secondary feature of the present invention, the cover element is an impermeable tape.

According to another secondary feature of the present invention, the lifting element comprises at least two fixed walls, two lower rollers, which keep the cover element adherent to the longitudinal aperture of the suction channel in front of and behind the lifting element, and two upper rollers, both disposed at a determinate distance from the longitudinal aperture, so that the compartment in this way has a profile with a trapezoid shape which progressively moves as the working head and hence the lifting element proceed.

According to this configuration, the lifting element has the possibility of translating and at the same time lifting the cover element from the longitudinal aperture in correspondence with its position, keeping it taut and covering the longitudinal aperture outside the lifting element. The walls of the compartment inside the lifting element are thus formed by the two fixed walls and by a portion of the cover element, without leaving gaps communicating with the outside.

According to a secondary feature of the present invention, one of the two fixed walls of the lifting element has a hole for connection with the suction pipe.

The suction pipe is connected to the lifting element on one of its fixed walls and thus communicates with the compartment, which in turn communicates with the suction channel by means of the longitudinal aperture.

According to a secondary feature of the present invention, the longitudinal aperture of the suction channel comprises a grid, which reinforces the support of the cover element on the longitudinal aperture.

BRIEF DESCRIPTION OF THE DRAWINGS

These and other characteristics of the present invention will become apparent from the following description of one form of embodiment, given as a non-restrictive example with reference to the attached drawings wherein:

FIG. 8 is a part of the work machine in FIG. 1;

FIG. 9 is a part of the work machine in FIG. 2;

FIG. 10 is a part of the work machine in FIG. 3.

DETAILED DESCRIPTION

Figure 1:
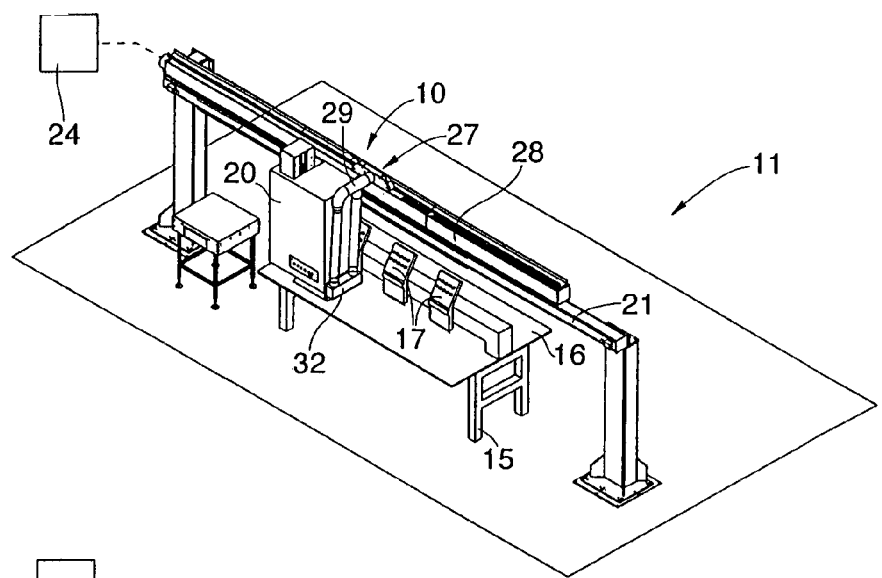
FIG. 1 is a three-dimensional view of a work machine comprising a suction apparatus according to the present invention in a first working position.
Figure 2:
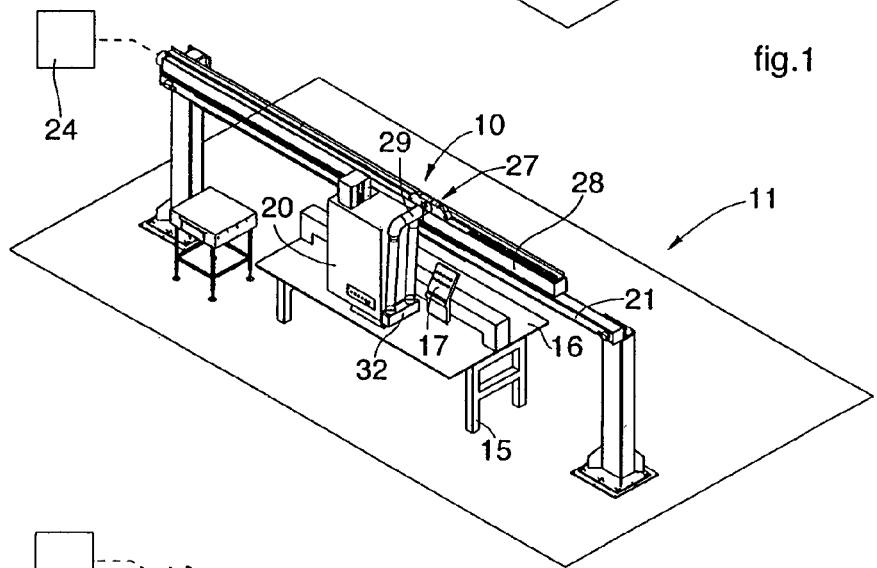
FIG. 2 is a three-dimensional view of the work machine in FIG. 1 in a second working position.
Figure 3:
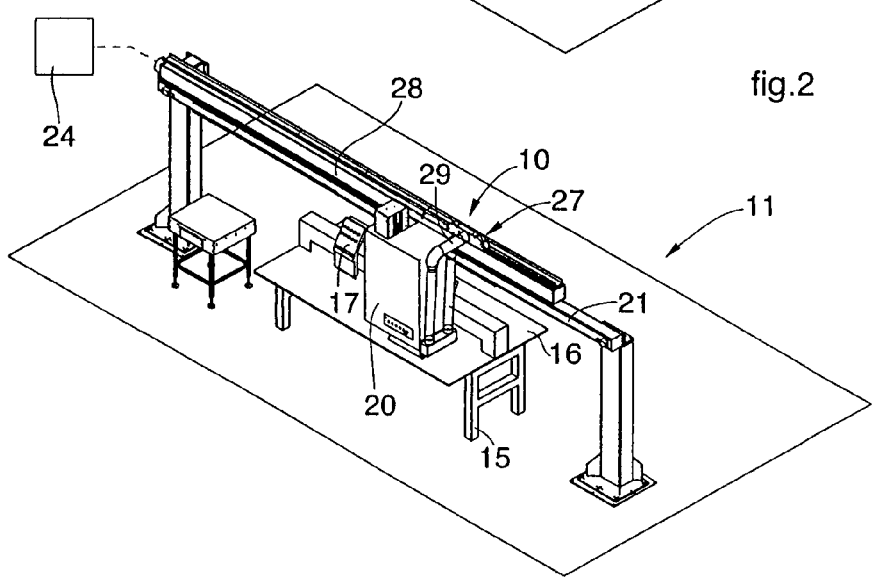
FIG. 3 is a three-dimensional view of the work machine in FIG. 1 in a third working position.
Figure 4:
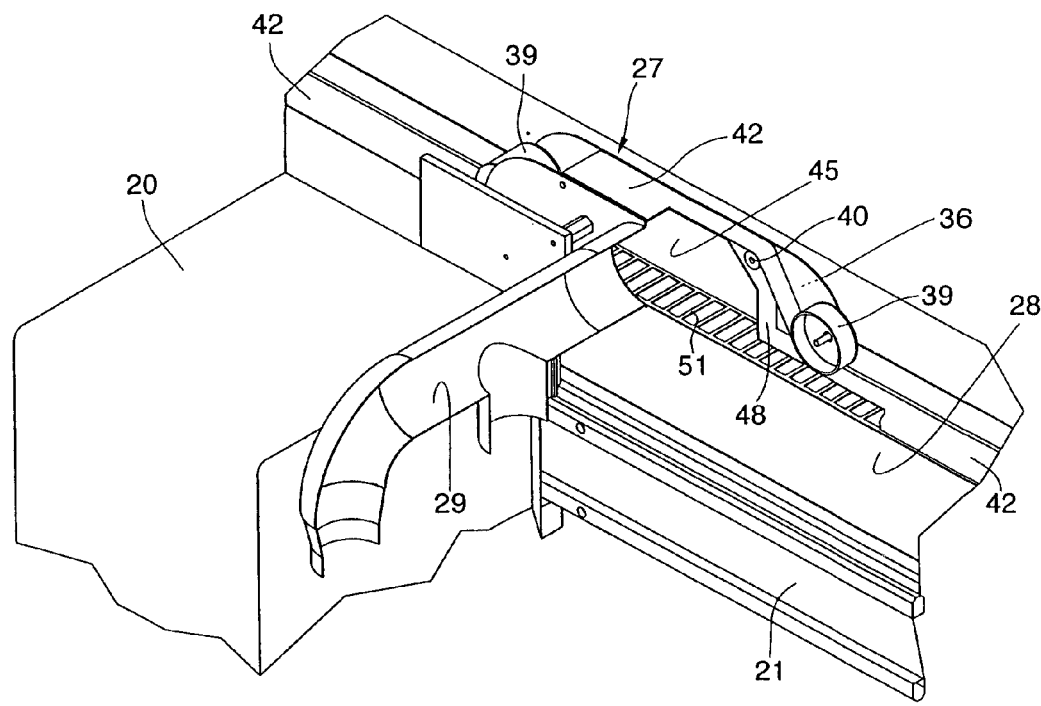
FIG. 4 is a partial section of the work machine in FIGS. 1, 2 and 3.
Figure 5:
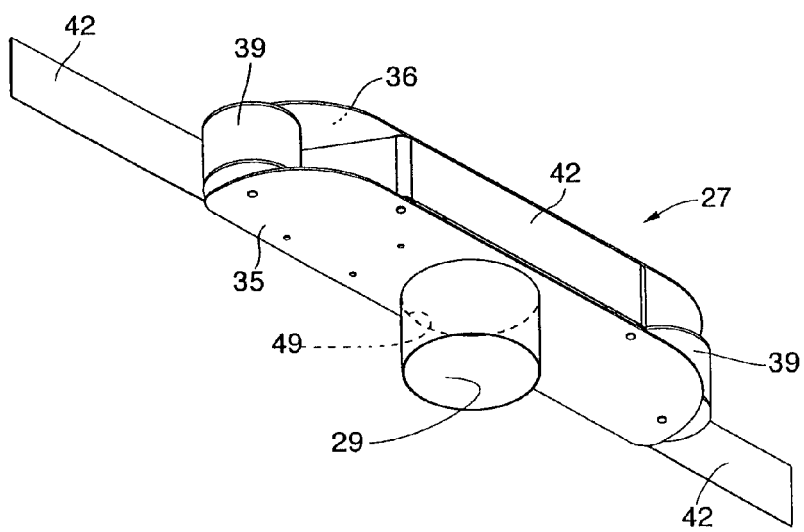
FIG. 5 is a three-dimensional view of one element of the work machine in FIGS. 1, 2 and 3.
Figure 6:
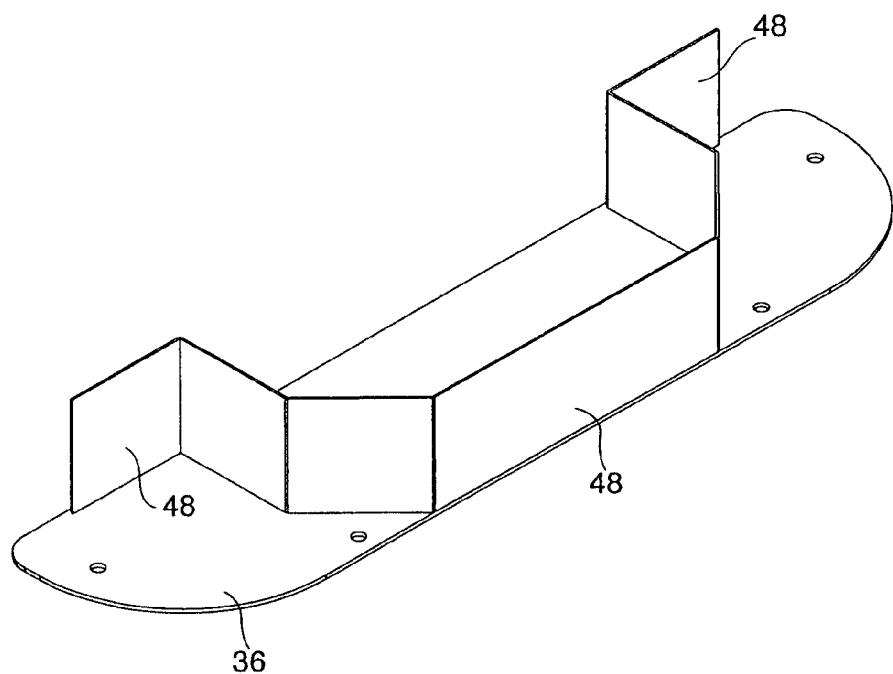
FIG. 6 is a part of the element in FIG. 5.
Figure 7:
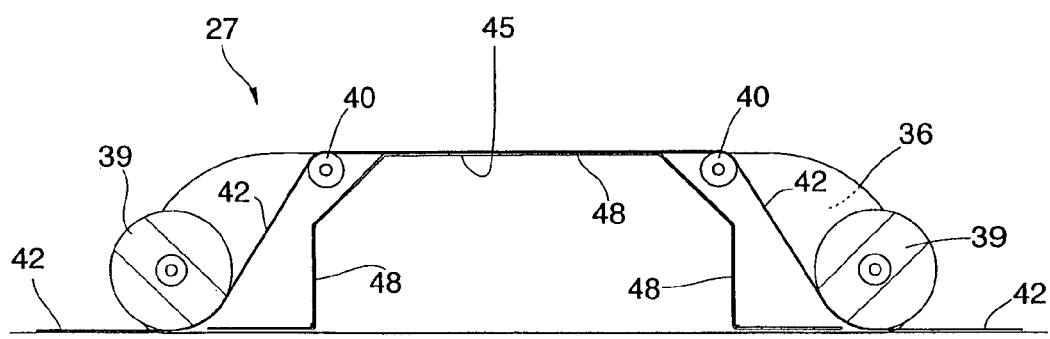
FIG. 7 is a longitudinal section of the element in FIG. 5.

With reference to FIGS. 1, 2 and 3, a suction apparatus 10 according to the present invention is associated with a work machine, in this case an embroidery/sewing machine 11, in order to aspirate the harmful fumes from a zone of the machine during the cutting operation.

The embroidery/sewing machine 11 in this case comprises a lower frame 15, on which a work bench 16 is attached. A fabric on which a material or decorative pattern is embroidered is attached during use on at least one of the work benches 16. A plurality of fixed embroidery heads 17, in this case one associated with each work bench 16, has the function of embroidering a material on the fabric attached to the work bench 16. A cutting unit, in this case a laser head 20, sliding on a longitudinal guide or laser bridge 21, suspended and positionable in correspondence with each embroidery head 17, has the function of cutting and possibly removing the superfluous part of material surrounding the part of fabric embroidered by the embroidery head 17, generating harmful fumes.

The suction apparatus 10 according to the present invention aspirates the harmful fumes, also using a filter 32 positionable upstream or downstream, generated by the laser head 20, to direct them toward a suction device 24 that aspirates the harmful fumes and expels them to the outside.

The suction apparatus 10 comprises a lifting element, in this case a mobile shuttle 27 (FIGS. 4, 5, 6 and 7) solid with the laser head 20 and disposed sliding on the longitudinal guide 21, a suction channel 28 connected to the suction device 24 and a suction pipe 29, which connects the mobile shuttle 27 with the laser head 20.

The mobile shuttle 27 comprises a first fixed wall 35 and a second fixed wall 36, shaped according to an arc of a circumference at their ends, parallel to each other and to the longitudinal guide 21. Two lower rollers 39 and two upper rollers 40, attached to the fixed walls 35 and 36 and having parallel axes of rotation, guide and stretch a cover element, in this case a tape 42, in order to lift it up in correspondence with the mobile shuttle 27, defining a cover shaped like a trapezoid and a compartment 45 inside the mobile shuttle 27. An omega profile element 48 is welded to the first fixed wall 35 and to the second fixed wall 36, creating a compartment 45 and sealing said compartment 45 from the surrounding environment, but not from the suction channel 28 and the suction pipe 29 with which it communicates. The first fixed wall 35 of the mobile shuttle 27 is provided with a hole 49, suitable to allow connection with the suction pipe 29.

The suction channel 28, disposed below, parallel to and solid with the longitudinal guide 21, communicates with the mobile shuttle 27 by means of a longitudinal aperture, in this case a grid 51 made over the whole longitudinal extension of the upper surface of the suction channel 28.

The tape 42 adheres to the grid 51, covering it along its whole longitudinal extension, except in correspondence with the part where the mobile shuttle 27 is positioned, where it is raised by the upper rollers 40 and lower rollers 39. The laser head 20, sliding in use along the longitudinal guide 21, translates together with the mobile shuttle 27 which, through the disposition of the upper 40 and lower rollers 39, allows to uncover the grid 51 and to define the compartment 45, and hence allows the operation to aspirate the harmful fumes, in correspondence with its position.

The suction pipe 29 is attached perpendicularly to the first fixed wall 35 of the mobile shuttle 27, putting the laser head 20 and mobile shuttle 27 in connection. Therefore a connection is obtained between the laser head 20 and the suction device 24, passing in sequence through the suction pipe 29, the mobile shuttle 27 and the suction channel 28.

FIGS. 8, 9 and 10 show the mobile shuttle 27 in relation respectively to FIGS. 1, 2 and 3. It can be seen how the mobile shuttle 27, irrespective of its position, lifts the tape 42 and uncovers the grid 51, defining the compartment 45 and allowing communication between the suction pipe 29, which aspirates the harmful fumes from the laser head 20, and the suction channel 28 connected to the suction device 24 which expels the harmful fumes to the outside.

In this way, the invention requires less frequent maintenance operations than in the state of the art, since it is not provided with pipes that are subjected to a continuous variation in flexion and curvature. Consequently there is less wear and fewer load losses.

Furthermore, the diminished load losses allow to use suction devices with a lower suction power than those in the state of the art.

It is clear that modifications and/or additions of parts may be made to the suction apparatus 10 as described heretofore, without departing from the field and scope of the present invention.

For example, a device to clean the suction channel 28 may be solidly associated with the mobile shuttle 27, so that it can move inside the suction channel 28.

It is also clear that, although the present invention has been described with reference to some specific examples, a person of skill in the art shall certainly be able to achieve many other equivalent forms of suction apparatus, having the characteristics as set forth in the claims and hence all coming within the field of protection defined thereby.

The invention claimed is:

1. A work machine comprising: a suction apparatus said suction apparatus configured to take in the harmful fumes generated by work operations, the work machine having at least a cutting unit to carry out work operations, a suction channel, provided with at least a longitudinal aperture, a cover element to cover said longitudinal aperture, a suction pipe and a lifting element solid with said cutting unit, interposed between said suction pipe and said suction channel and defining a compartment, wherein said lifting element comprises at least a lifting roller suitable to selectively lift said cover element and to define a passage in correspondence to the position of said lifting element, so that at least part of said compartment is closed by said cover element and the only part connected to said suction pipe is the one corresponding to the raised part of said cover element.

2. The work machine as in claim 1, wherein said lifting element comprises at least two fixed walls, two lower rollers to keep said cover element adherent to said longitudinal aperture in front of and behind said lifting element, and two upper rollers so that said compartment has a trapezoid shaped profile.

3. The work machine as in claim 2, wherein it comprises an omega profile element, associated to said two fixed walls, so as to generate and seal said compartment communicating with said suction channel and with said suction pipe.

4. The work machine as in claim 1, wherein at least one of said fixed walls of said lifting element has a hole for the connection to said suction pipe.

5. The work machine as in claim 1, wherein said cover element is a tape made of a rubber material.

6. The work machine as in claim 1, wherein said longitudinal aperture of said suction channel comprises a grid.

\* \* \* \* \*